E. T. ROBINSON.
TRACTOR FOR STEERING VEHICLE WHEELS.
APPLICATION FILED NOV. 21, 1913.

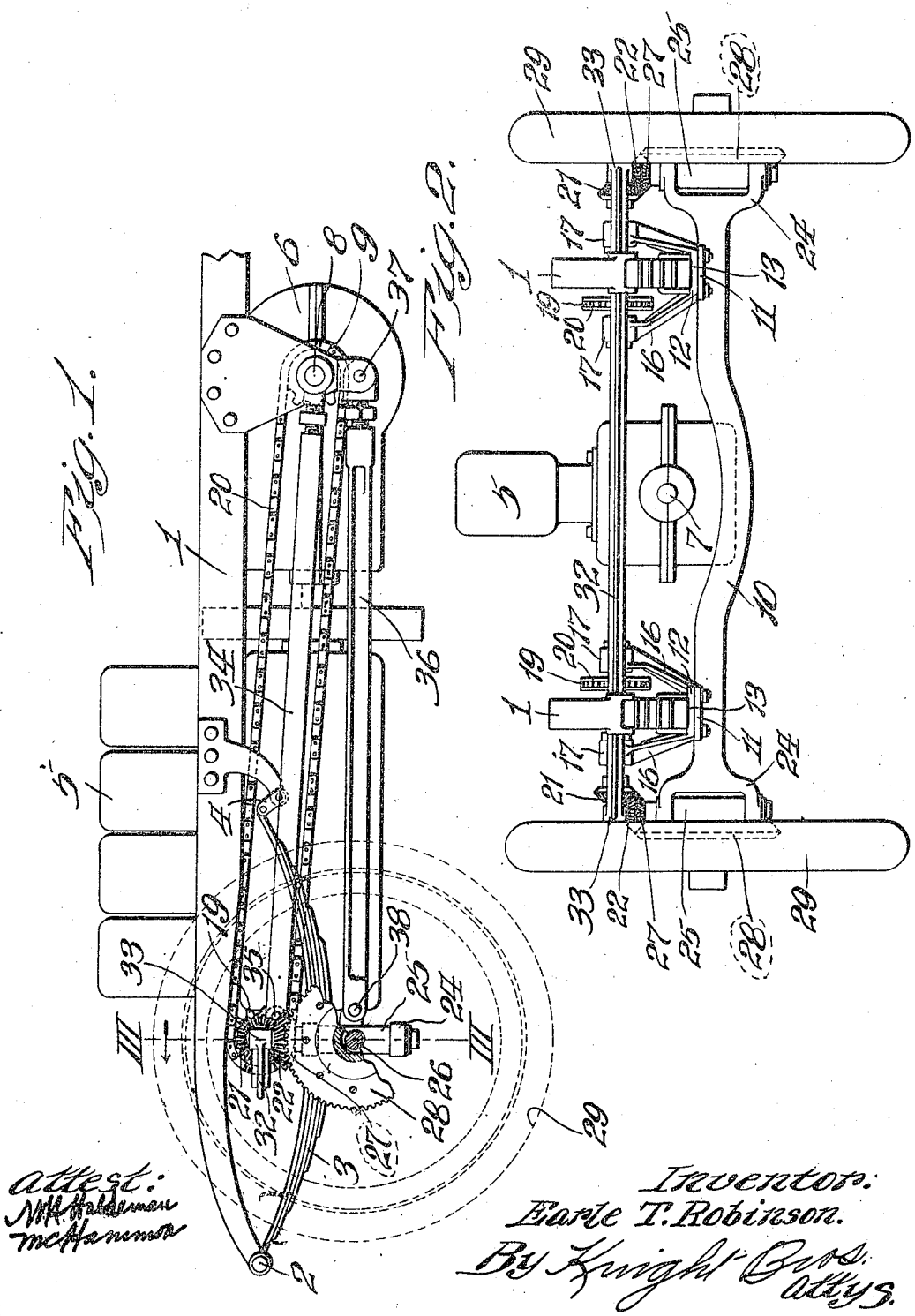

1,201,629.

Patented Oct. 17, 1916.
2 SHEETS—SHEET 2.

Attest:
M. A. Huldeman
Nel Hammun

Inventor:
Earle T. Robinson.
By Knight Bros. attys.

UNITED STATES PATENT OFFICE.

EARLE T. ROBINSON, OF UNIVERSITY, MISSOURI.

TRACTOR FOR STEERING VEHICLE-WHEELS.

1,201,629.   Specification of Letters Patent.   Patented Oct. 17, 1916.

Application filed November 21, 1913. Serial No. 802,195.

*To all whom it may concern:*

Be it known that I, EARLE T. ROBINSON, a citizen of the United States of America, residing in University, in the county of St. Louis and State of Missouri, have invented certain new and useful Improvements in Tractors for Steering Vehicle-Wheels, of which the following is a specification.

One of the objects of this invention is to provide improved means of applying power to the steering wheels of motor-driven vehicles.

Another object is to provide an improved equipment which can be applied to the steering wheels of vehicles so said wheels will serve as tractor wheels as well as guiding wheels.

A further object is to provide an improved tractor which can be applied to the forward wheels of a vehicle, the rear portion of said vehicle, adjacent the rear axle, being of such design as to make it impossible to apply power to said rear axle.

Figure 3:
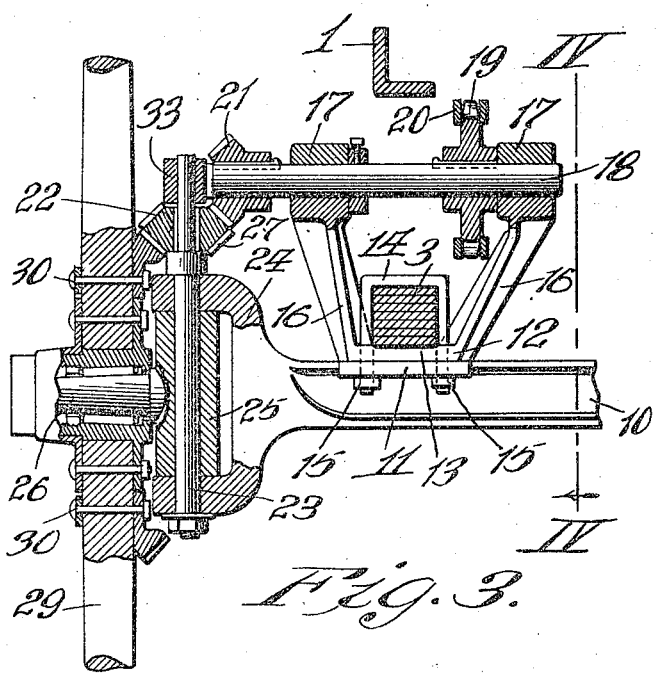
Figure 4:
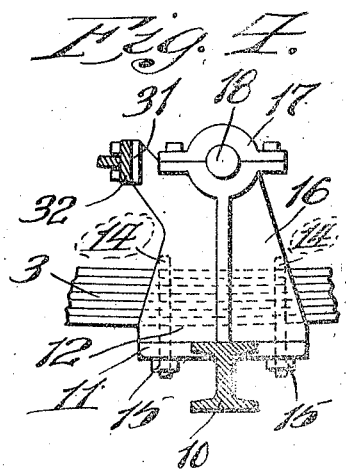
Figure 5:
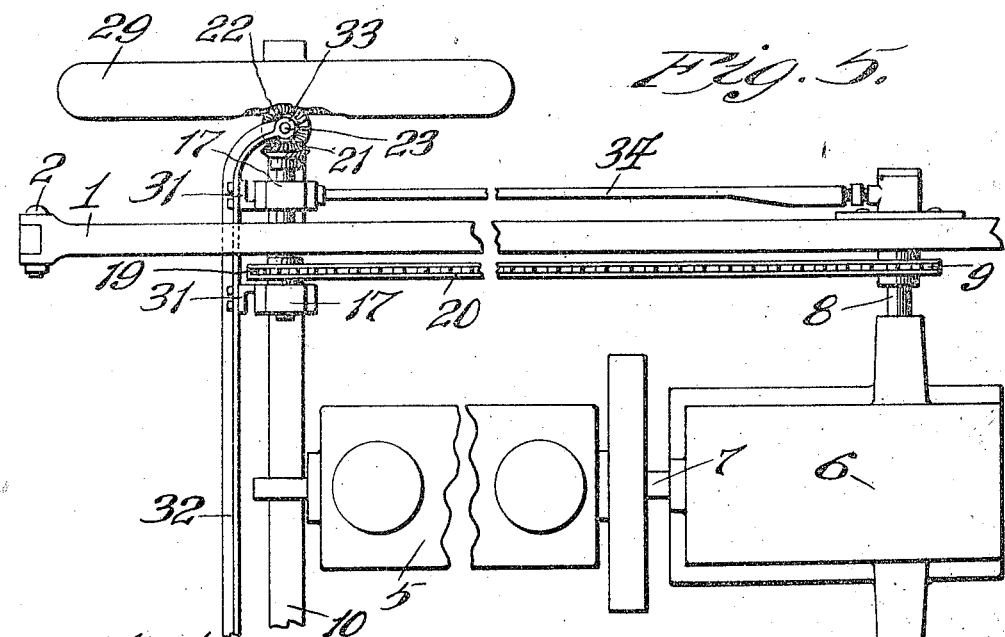

Other and further objects will appear in the specification, and be specifically pointed out in the appended claims, reference being had to the accompanying drawings exemplifying the invention, and in which, Figure 1 is a side elevation of the forward portion of the running gear of a vehicle showing this improvement applied to the front wheels. Fig. 2 is a front elevation of Fig. 1. Fig. 3 is an enlarged vertical section taken on the line III—III, Fig. 1. Fig. 4 is an enlarged vertical section taken on the line IV—IV, Fig. 3. Fig. 5 is a fragmentary plan view of a portion of Fig. 1.

Referring to the drawings: 1 designates the side members which form the running gear of a vehicle. Secured at 2 to the forward end of said side members are the usual half-elliptic springs 3, said springs being connected at their rear ends to the links 4.

Mounted lengthwise between the side members 1 is a motor 5 and transmission gearing 6. Said motor and transmission are secured to the side members 1 in any suitable manner (not shown). The motor shaft 7 extends into said transmission. Extending from the transmission 6, and at right angles to the shaft 7, is a shaft 8, said shaft having secured thereto adjacent each end a sprocket 9.

Mounted on the front axle 10 are the usual spring blocks 11. Secured to each of said blocks and said front axle is a supporting member 12. Said supporting members 12 each have a seating portion 13. Said seating portions are adapted to be mounted on the blocks 11, and are for the reception of the springs 3. These supporting members 12 are secured on the front axle 3 by the clips 14 and nuts 15 (see Figs. 2 and 4). Formed integral with each of said supports 12 are a pair of uprights 16. Said uprights have bearings 17 formed thereon. Mounted in a pair of said bearings 17 is a short horizontal shaft 18. Secured to each of said shafts, between said bearings, is a sprocket 19, each of said sprockets being in alinement with one of the sprockets 9. There is an endless belt 20 carried by each pair of said sprockets 9 and 19. Secured to each of said shafts 18, adjacent one end is a bevel gear 21, each of said bevel gears meshing with the bevel gear 22. Each of said bevel gears is loosely mounted on a vertical pin 23, said pins being carried by the yokes 24 formed on the ends of the front axle 10. Mounted on said pins 23 are the usual front steering knuckles 25. Each of said knuckles has a spindle 26 formed thereon. Each of said bevel gears 22 has formed integral therewith a bevel gear 27. Said bevel gears 27 are each in mesh with a bevel gear 28. Said bevel gears 28 are secured to the inside of the front wheels 29 by the bolts 30. Secured to one side of said bearings 17, at 31, is a tie bar 32. Said tie bar has formed at its ends bearings 33, each of said bearings engaging the upper ends of the pins 23. This tie bar 32 serves as an additional support to the uprights 16 and pins 23.

This improved device is designed primarily for the purpose of giving traction power to the steering wheels of vehicles, as some vehicles, such as fire engines, are so designed that it is next to impossible to apply power to the rear wheels. This improved device is also desirable for vehicles which are to be converted into four-wheel drives, as the supports 12 can be readily secured to any front axle, and pins 23 can be mounted in the steering knuckles. Also, bevel gears, such as 28, can be secured to the front wheels, and motor power can be applied to said front wheels by the manner of gearing shown.

What I claim is:

1. A tractor for steering wheels of vehicles comprising an axle, a yoke formed on said axle, a pin carried by said yoke, a steering knuckle mounted on said pin, a wheel having a gear secured thereto carried by said knuckle, a U-shaped support mounted on said axle, a shaft having a gear secured thereto revolubly mounted in said support, a gear loosely mounted on said pin meshing with said gear on said shaft, said gear on said pin meshing with said gear on said wheel, said shaft and gears forming means for turning said wheel when power is applied to said shaft, and a tie rod secured to the extending ends of said support and said pin, said support adapted to carry a leaf spring beneath said shaft, said spring being for the support of a vehicle body.

2. A tractor for steering wheels of vehicles comprising an axle, yokes formed on said axle, supports mounted on said axle, a spring seat formed on each of said supports, a shaft carried by each of said supports, a spring mounted on each of said spring seats between said axle and said shafts, a pin mounted in each of said yokes, a steering knuckle carried by each of said pins, a gear loosely mounted on each of said pins, a wheel revolubly mounted on each of said knuckles, each of said wheels having a bevel gear securely mounted thereon, said gears on said wheels meshing with said gears on said pins, a gear securely mounted on each of said shafts meshing with said gear on each of said pins, and a tie rod for tying said supports together, the ends of said tie rod engaging the upper ends of said pins, said springs adapted to support the frame of a vehicle.

3. In a vehicle, a frame, a front axle for said frame, U-shaped supports mounted on said axle, a tie rod secured to said supports, a horizontal shaft revolubly mounted on each of said supports, a spring mounted on each of said supports between said axle and said shafts, said springs being adapted to support said frame, steering knuckles mounted on said axles, a pin extending upwardly from each of said steering knuckles, said tie rod engaging said pins, a tractor wheel mounted on each of said knuckles, and gears mounted between said shafts and said tractor wheels adapted to revolve said tractor wheels.

4. In a vehicle, an axle, a U-shaped support mounted on said axle, a spring seat formed on said support, a bearing formed on each extending portion of said support, a shaft revolubly mounted in said bearings of said support, a tie rod for reinforcing said bearings, and a leaf spring mounted on said spring seat between said axle and said shaft.

EARLE T. ROBINSON.

In the presence of—
M. C. HAMMON,
H. G. FLETCHER.